US007477766B1

(12) United States Patent
Roehrig et al.

(10) Patent No.: US 7,477,766 B1
(45) Date of Patent: Jan. 13, 2009

(54) METHOD AND APPARATUS FOR EXPANDING THE USE OF EXISTING COMPUTER-AIDED DETECTION CODE

(75) Inventors: Jimmy Roehrig, Palo Alto, CA (US); Sussan Pourjavid, Sunnyvale, CA (US); Xiaolan Zhang, Santa Clara, CA (US); Haili Chui, Mountain View, CA (US); Akira Hasegawa, Cupterino, CA (US)

(73) Assignee: Hologic, Inc, Marlborough, MA (US)

( * ) Notice: Subject to any disclaimer, the term of this patent is extended or adjusted under 35 U.S.C. 154(b) by 160 days.

(21) Appl. No.: 11/375,379

(22) Filed: Mar. 13, 2006

Related U.S. Application Data

(63) Continuation of application No. 10/079,327, filed on Feb. 19, 2002, now Pat. No. 7,072,498, and a continuation of application No. 09/992,059, filed on Nov. 21, 2001, now Pat. No. 7,054,473.

(51) Int. Cl.
*G06K 9/00* (2006.01)
(52) U.S. Cl. .......................... 382/128; 382/294; 378/4
(58) Field of Classification Search ......... 382/128–133, 382/162, 168, 169, 194, 196, 203, 209, 232, 382/234, 237, 240, 255, 274, 277, 291, 305, 382/100, 134, 155, 224, 276, 294, 312; 600/408, 600/409; 378/28, 37, 4, 21; 707/102; 356/443; 345/424, 427
See application file for complete search history.

(56) References Cited

U.S. PATENT DOCUMENTS

| | | | |
|---|---|---|---|
| 4,907,156 A | 3/1990 | Doi et al. | |
| 4,983,044 A * | 1/1991 | Schweber | 356/443 |
| 5,133,020 A | 7/1992 | Giger et al. | |
| 5,289,374 A | 2/1994 | Doi et al. | |
| 5,343,390 A | 8/1994 | Doi et al. | |
| 5,452,367 A | 9/1995 | Bick et al. | |
| 5,491,627 A | 2/1996 | Zhang et al. | |
| 5,537,485 A | 7/1996 | Nishikawa et al. | |
| 5,586,160 A * | 12/1996 | Mascio | 378/37 |
| 5,657,362 A | 8/1997 | Giger et al. | |
| 5,790,690 A * | 8/1998 | Doi et al. | 382/128 |
| 5,799,100 A | 8/1998 | Clarke et al. | |
| 5,828,774 A | 10/1998 | Wang | |
| 5,873,824 A * | 2/1999 | Doi et al. | 600/408 |
| 5,881,124 A | 3/1999 | Giger et al. | |

(Continued)

FOREIGN PATENT DOCUMENTS

WO WO 00/52641 9/2000

OTHER PUBLICATIONS

U.S. Appl. No. 10/079,327, filed Feb. 19, 2002, Roehrig, Jimmy.

(Continued)

*Primary Examiner*—Seyed Azarian
(74) *Attorney, Agent, or Firm*—Blakely Sokoloff Taylor & Zafman

(57) ABSTRACT

A method and apparatus for analyzing a medical image obtained from one of a plurality of digital modalities, the method comprising transforming or mapping the initial medical image to create a uniform contrast response and appearance regardless of the original modality of the image.

23 Claims, 14 Drawing Sheets

U.S. PATENT DOCUMENTS

| | | | |
|---|---|---|---|
| 6,198,838 | B1 | 3/2001 | Roehrig et al. |
| 6,263,092 | B1 | 7/2001 | Roehrig et al. |
| 6,434,262 | B2 * | 8/2002 | Wang .......................... 382/132 |
| 6,483,933 | B1 * | 11/2002 | Shi et al. .................... 382/132 |
| 6,516,045 | B2 | 2/2003 | Shepherd et al. |
| 6,580,818 | B2 * | 6/2003 | Karssemeijer et al. ...... 382/128 |
| 6,584,216 | B1 * | 6/2003 | Nyul et al. .................. 382/131 |
| 6,725,231 | B2 * | 4/2004 | Hu et al. ..................... 707/102 |
| 6,738,500 | B2 * | 5/2004 | Bankman et al. ............ 382/128 |
| 2002/0070970 | A1 | 6/2002 | Wood et al. |
| 2003/0095697 | A1 | 5/2003 | Wood et al. |

OTHER PUBLICATIONS

U.S. Appl. No. 09/721,347, Hartmann et al.

Jain, Anik K., et al., "Algorithms Clustering Data," Prentice Hall, Mar. 1998, pp. 143-222.

Kupinski, Matt, et al., "Computerized detection of mamographic lesions: Performance of artificial neural network with enhanced feature extraction," SPIE vol. 2434, p. 598.

Giger, Maryellen, et al., "Image Processing and Computer-aided Diagnosis," Radiol Clin North Am, May 1996, vol. 34, N 3, pp. 565-596.

Burhenne, Linda J. Warren, et al., "Potential Contribution of Computer-aided Detection to the Sensitivity of Screening Mammography," Radiology, May 2000, pp. 554-562.

Giger, Maryellen, et al., "An 'Intelligent' Workstation for Computer-aided Diagnosis," RadiopGraphics, May 1993, vol. 13, pp. 647-656.

Giger, Maryellen, et al., "Development of a 'smart' workstation for use in mammography," In Proceedings of SPIE, vol. 1445, 1991, pp. 101-103.

Barski, Lori L., et al., "New automatic tone scale method for computed radiography," Proc SPIE, 1998, vol. 3335, pp. 164-178.

Roehrig, Jimmy, et al., "The promise of computer aided detection in digital mammography," European Jour of Radiology, vol. 31, 1997, pp. 35-39.

* cited by examiner

Fig. 9A — Digitized film
Fig. 9B — Raw digital images
Fig. 9C — Digital images after transformation to film space

METHOD AND APPARATUS FOR EXPANDING THE USE OF EXISTING COMPUTER-AIDED DETECTION CODE

The present patent application is a Continuation of application Ser. No. 10/079,327, filed Feb. 19, 2002 now U.S. Pat. No. 7,072,498.

RELATED CASES

This application is a continuation-in-part of U.S. patent application Ser. No. 09/992,059 filed Nov. 21, 2001, now U.S. Pat. No. 7,054,473 and incorporates that application in its entirety by reference.

FIELD OF THE INVENTION

The present invention relates to a method for training or tuning a computer-aided diagnosis (CAD) system, and more specifically, to expanding the use of an existing CAD system to digitally acquired images.

BACKGROUND

It is a well-known fact in the computer-aided detection (CAD) research community that proper tuning and training of a pattern recognition code (such as the CAD code referred to in this invention) requires a large database of training cases. Anil K. Jain and Richard C. Dubes, "Algorithms Clustering Data", Prentice Hall, March 1988 contains a discussion of the requirements on the number of training examples as a function of degrees of freedom. Some review papers that describe the concepts of feature extraction and classification by neural networks in a CAD application are: Matt Kupinski et al., "Computerized detection of mammographic lesions: Performance of artificial neural network with enhanced feature extraction", SPIE Vol 2434, p 598, and Maryellen Giger and Heber MacMahon, "Image Processing and Computer-aided Diagnosis", RSNA Vol. 34, N 3, May 1996)

A large database is needed for two reasons. First, abnormalities such as lesions in mammograms have a wide spectrum of differing appearances, and the training database should contain examples of all types. Second, these codes typically contain both rule-based criteria and neural network classifiers to reduce the number of false positives, and the proper values of all parameters used in these rules and classifiers depends on having seen many more training examples than there are numbers of parameters, or features, in order to avoid "overtraining", or "over-optimizing," the tendency of the code to memorize its training data.

A rule of thumb is that one should have at least 10 times more training cases than the degrees of freedom in the decision making code. Another conservative practice is to separate the training database from the test database, and maintain absolute independence in order to avoid biased performance results. In a study performed by Burhenne et. al. (Burhenne et. al., Potential Contribution of Computer-aided Detection to the Sensitivity of Screening Mammography, Radiology, May 2000, p 554-562) performance of a particular CAD code was tested on an independent database of 1083 breast cancers. This particular code was "tuned", or "trained", on a "training database" of approximately 1500 cancer cases.

FIG. 10 shows an example of the use of a rule to separate true lesions from false positives. In this example, one feature is plotted versus another feature in a scatter plot. The true lesions 1020 appear on this scatter plot as dark x's, the false positives as light dots 1030. It is apparent that the true lesions tend to cluster in a band near the center of the scatter plot, while the false positives are mostly in a vertical cluster below the true positives. By using the dark dashed line 1010 as a "decision surface", and accepting only the marks above the line, most of the false positives will be eliminated while most of the true positives are retained. It can be appreciated that the more "training", or "example" cases one has, the better the line or decision surface will be placed, i.e. the more optimal the separation of the true lesions from the false positives. In practice, a typical CAD code may have dozens of such rules, as well as a classifier to allow decisions to be made in a complex multi-featured decision space.

Recently a new mammographic x-ray detector has been approved by the FDA: the Senograph 2000 produced by GE. This product will soon be followed by other similar digital detectors produced by such companies as Lorad, Fisher, Siemens, and Fuji. In the field of chest radiography, digital detectors have been available for some time. Now, there is a very critical barrier to the use of CAD codes applied specifically to the medical images obtained by these new detectors. This is the fact that the devices have been in existence for such a short time that the number of cancer cases taken and archived is not yet sufficient to train or tune these codes. The number of cancers in existence detected in these digital detectors is not yet sufficient to even test these codes with great confidence. Using CAD codes on direct digital medical images with any confidence therefore requires a method to obtain parameters and feature values needed by the code from a source other than the small number of existing cases.

SUMMARY OF THE INVENTION

A method and apparatus for analyzing a medical image obtained from one of a plurality of digital modalities, the method comprising transforming or mapping the initial medical image to create a uniform contrast response and appearance regardless of the original modality of the image.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for analyzing a medical image obtained from one of a plurality of modalities is described. The method transforms the initial medical image to create the same contrast response and appearance regardless of the original modality of the image. This permits the use of computer aided diagnosis (CAD) code that was trained on film based, or other input based images. This simplifies the adaptation of a new film, or of digital imaging systems without requiring an extended period to obtain an adequate set of images of the new type for training and tuning the CAD code. Since the number of test cases needed for tuning far exceeds the number available for newly adapted systems, the present invention permits the faster conversion to new technologies, such as film to digital in radiology departments.

Figure 9:
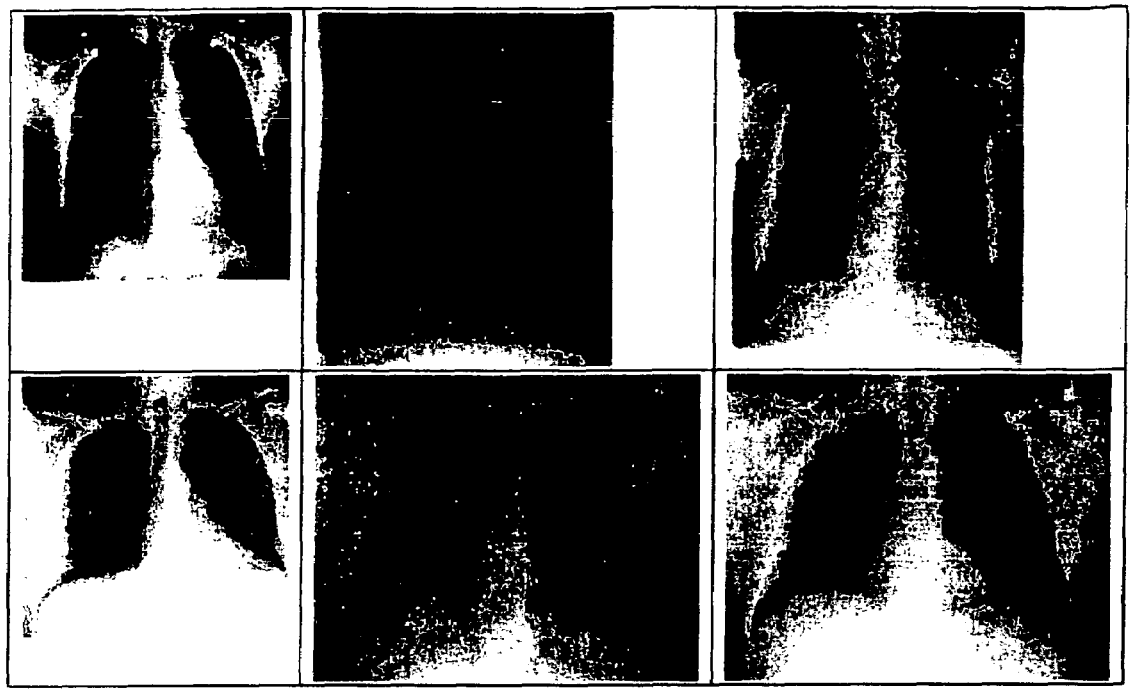
FIGS. 9A-C illustrate the differences between images acquired using film, images acquired using a digital detector, and the digitally acquired images after transformation.

FIGS. 9A-C illustrate the differences between images acquired using film, images acquired using a digital detector, and the digitally acquired images after transformation. As can be seen, the original image, FIG. 9A, which was used to train the CAD code has a certain gray scale level and abnormalities would have an expected contrast with respect to their surroundings. The digitally acquired image, FIG. 9B has a substantially different contrast. Therefore, it would be expected that CAD code that had been trained on the original image (FIG. 9A) would not perform correctly on the digitally acquired image (FIG. 9B). However, the conversion, discussed in more detail below, converts the digital image (FIG. 9B) to a digital image having the "standard canonical form" shown in FIG. 9C. As can be seen, the transformed/remapped image of FIG. 9C is much closer in gray scale levels and contrast to the original image (FIG. 9A). Thus, the CAD code, trained on original images like the one shown in FIG. 9A can easily be used to detect abnormalities on the remapped image of FIG. 9C. This process or remapping, as well as the tuning process to improve the CAD code is described in more detail below.

Figure 1:
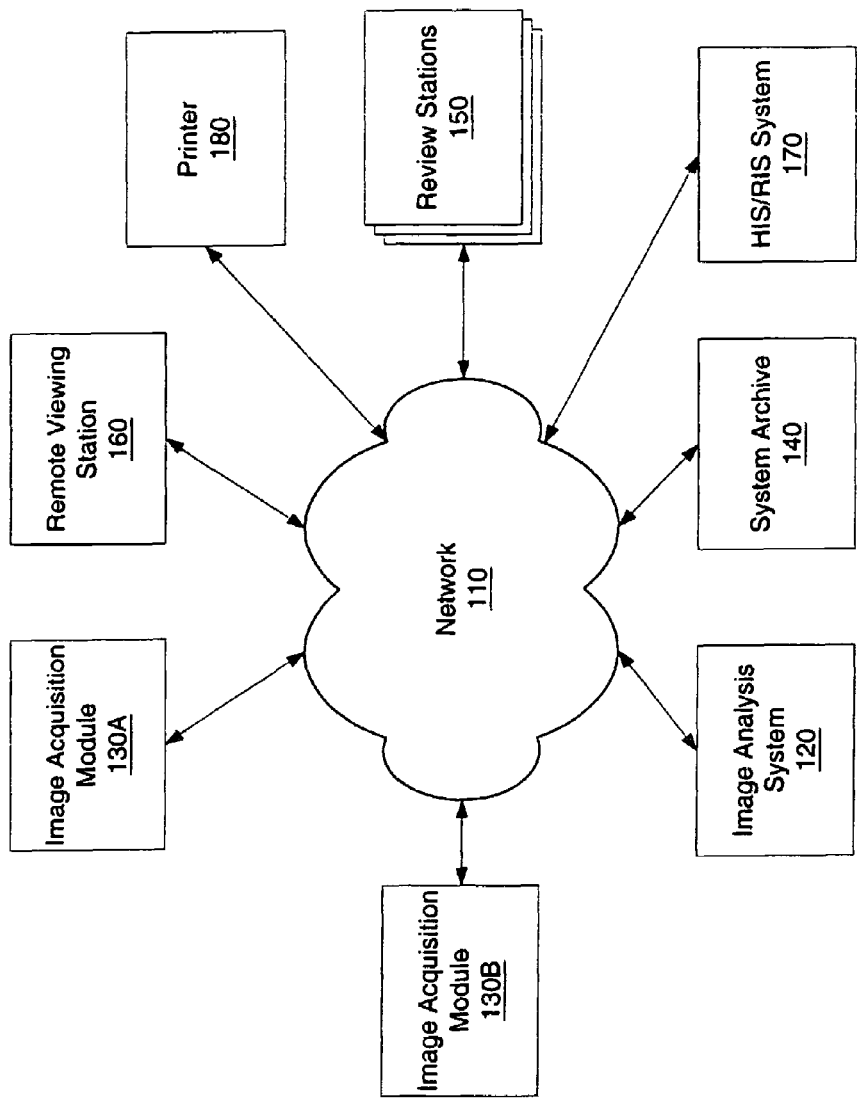
FIG. 1 is a block diagram of a network that may be used with the present invention.

FIG. 1 is a block diagram of a network that may be used with the present invention. The system includes one or more image acquisition modules 130A, 130B. The image acquisition modules may be conventional film image acquisition systems, which are known in the art, and/or digital image acquisition systems. Standard methods may be used to obtain the analog or digital images, whether two or three-dimensional. The outputs of the image acquisition modules 130A, 130B, are digital or analog images. One example of a film based image acquisition system 130A is described in Wang, U.S. Pat. No. 5,828,774.

These images are passed to image analysis system 120. For one embodiment, the images are sent through network 110 to image analysis system 120. Network 110 may be an internal local area network (LAN), a wide area network (WAN), the Internet, or any other type of network. For one embodiment, if the network 110 is not a local internal network, then the images sent by image acquisition modules 130A, 130B are encrypted or in some other way protected to ensure the patient's privacy. This permits the use of a centralized image analysis system 120 which may receive images from multiple offices that may be located anywhere in the world. Similarly, the analyzed images/output may be sent to review stations anywhere in the world.

The image analysis system 120 performs the preprocessing, recognition, and/or post-processing of the images. The image analysis system 120 is described in more detail below.

The system, for one embodiment, further includes a HIS/RIS (hospital information system/radiology information system) system 170. The HIS/RIS system 170 is coupled to the image analysis system 120, either directly or through network 110. The HIS/RIS system 170 provides patient data, in one of a variety of formats. For one embodiment, the HIS/RIS system 170 may provide data in the HL7 format. Alternative formats may be used. The images processed by image analysis system 120 may be stored within a patient record, in the HL7 format. For another embodiment, the image may be stored in DICOM format, including the appropriate patient information.

For one embodiment, a copy of the processed images is stored in system archive 140, permitting retrieval of the image. For one embodiment, a lower resolution image is stored. For one embodiment, the stored image does not include any tagging or other indicators added by image analysis system 120. For another embodiment, the owner of the system may select the format of the images stored in system archive 140.

The images are displayed to a reviewer at review station 150. Review stations 140 may be directly coupled to image analysis system 120, or coupled through a network. For one embodiment, the images may further be viewed at remote viewing stations 160. Remote viewing stations 160 may be conventional computer systems coupled to the network 110, may be handheld devices, laptop computers, or any other display mechanism. The remote viewing stations 160 may be wirelessly linked to the network, to permit fully mobility. This permits a doctor in a remote location to review the images, and may be used to allow the patient or others to review the images remotely. Thus, for example, a radiologist at a central location may initially review and analyze the images, annotate them. Then, the images, and notation—or a report generated based on the images and notation—is sent to a remote system where the doctor can review the data with the client.

For one embodiment, the images, report, or other output may be sent to a printer 180. The printer 180, for one embodiment, may print to film, to permit conventional review of the enhanced images. For one embodiment, the printer 180 may print multiple images, for example, one set of original images, a set of enhanced images, and a set of enhanced images with markers indicating the abnormalities found by the image analysis system 120. The printer 180 may be coupled to the image analysis system 120 and/or the system archive 140 either directly or through network 110. As discussed above with respect to the review stations 150, 160, the printer 180 need not be in the same location as the image analysis system 120.

Of course, not all of these elements must be present in order to implement the present system. At its simplest, the system includes an image acquisition module 130A, an image analysis system 120, and a review station 150 that permits viewing of the images. These systems 120, 130A, 150 may be coupled directly, without the use of a network 110. At its most complex, the system may be a distributed system having image acquisition modules 130A, 130B at various remote locations, while a central archive 140 and one or more image analysis systems 120 are used to process the acquired images. Then, the images may be sent to various local or remote review stations 150, 160. Note that although the image analysis system 120 illustrated as once central device, it may be a distributed system.

Figure 2A:
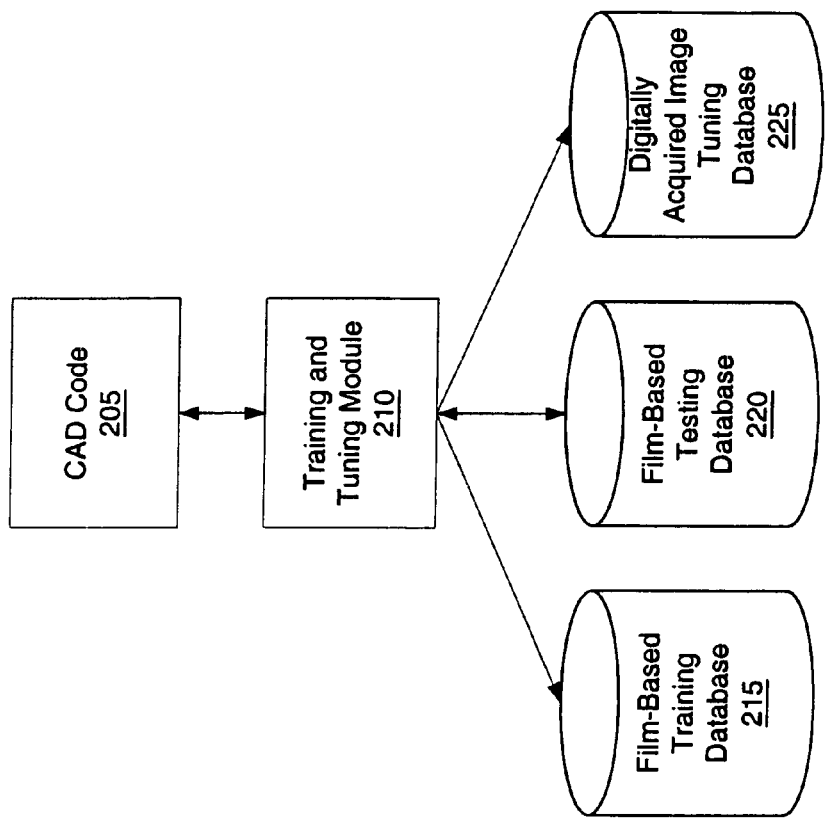
FIG. 2A is a block diagram of one embodiment of the training system initially used to train the CAD code.

FIG. 2A is a block diagram of one embodiment of the training system initially used to train the CAD code. The CAD code 205 has been trained on a database of digitized medical images 215, where the original films have been digitized by a laser or CCD scanner. If this database is large enough the parameters used by the code can be optimized such that the performance, measured by metrics such as sensitivity and specificity, is stable, well characterized, and gives a good indication of the code's performance on future cases input to the system. This is determined using the testing database 220, generally also using a database of digitized medical images.

Figure 5A:
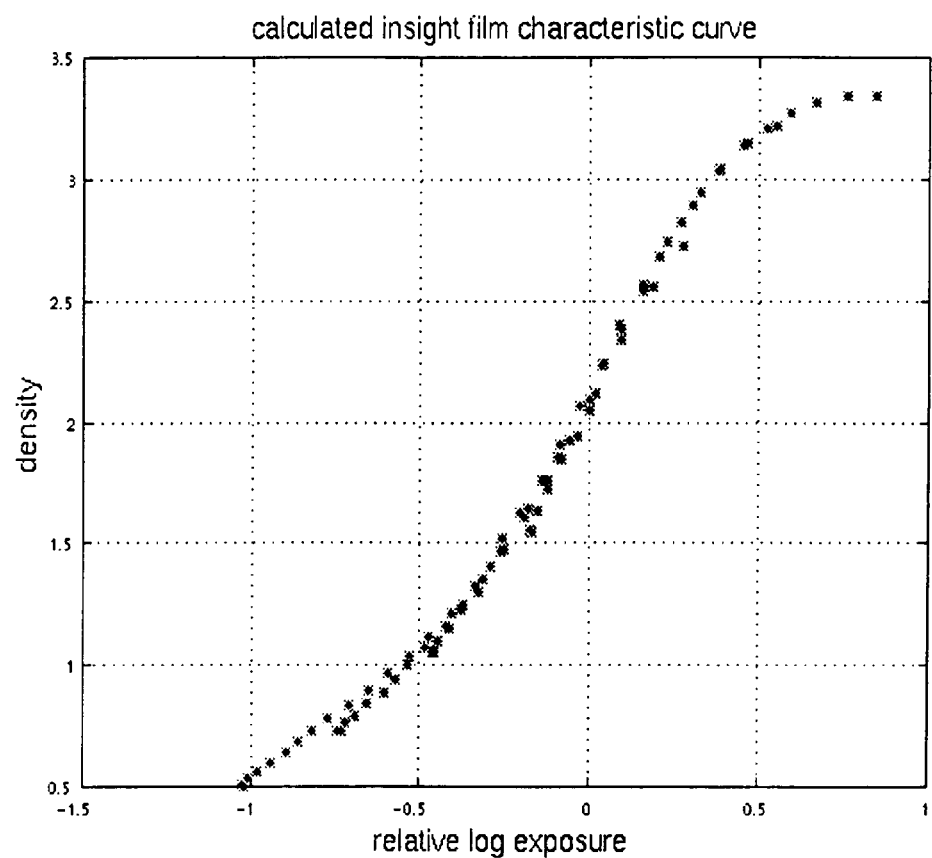
FIGS. 5A and 5B illustrate characteristic curves for two types of film.
Figure 5B:
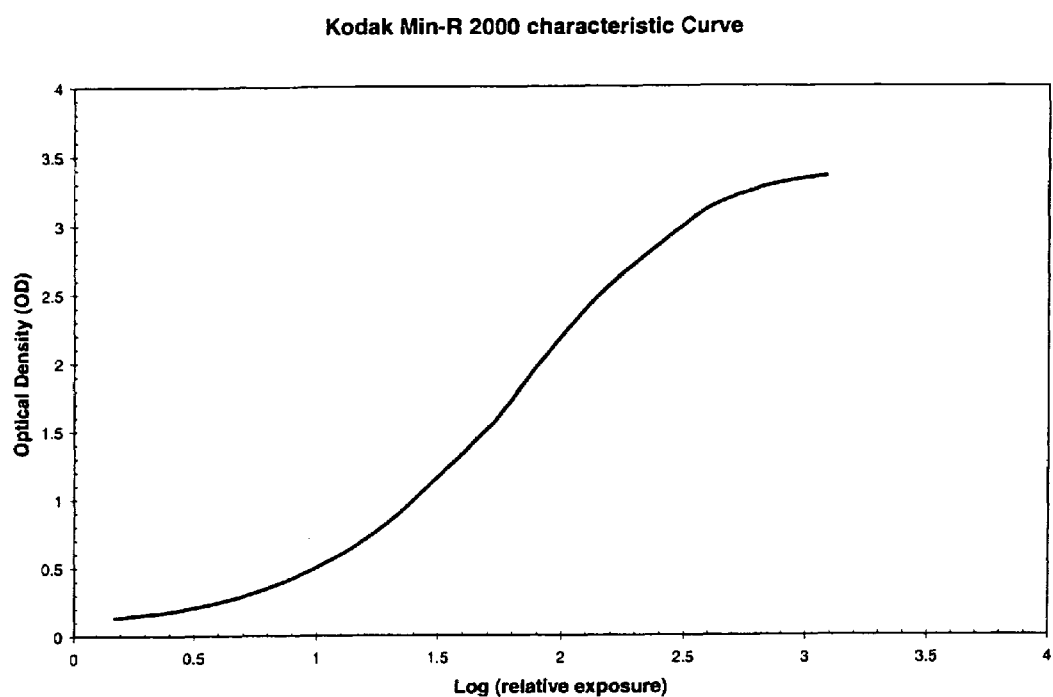
Figure 5C:
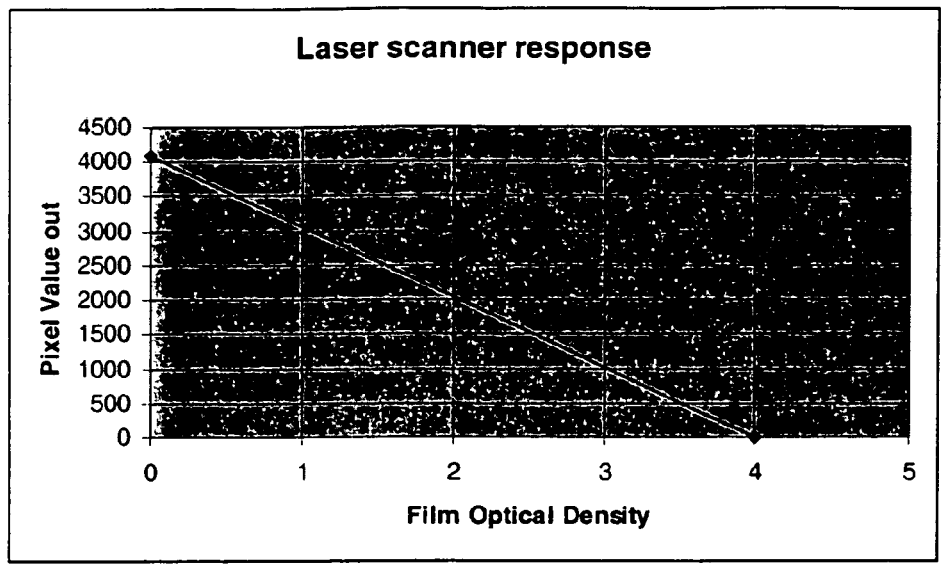
FIG. 5C shows a typical response curve for a digitizing scanner, which effectively transforms film OD to pixel value.

An important characteristic of the images for detecting abnormalities such as lesions is the "characteristic" curve, which describes the dependence of the x-ray film to exposure. Typical characteristic curves are shown in FIGS. 5A and 5B. FIG. 5A illustrates the characteristic curve of the Kodak Insight film, often used for chest radiographs. FIG. 5B illustrates the characteristic of the Kodak Min-R2000 film, often used for mammograms. FIGS. 5A and B show the dependence of the optical density (OD) on exposure. FIG. 5C shows a typical response curve for a digitizing scanner, which effectively transforms film OD to pixel value. Upon digitizing the film, one obtains a two-dimensional array in which each pixel value represents the exposure striking the film screen (the detector). The slope of the characteristic curve determines the contrast response, or change of output pixel value with change of incoming exposure.

Figure 10:
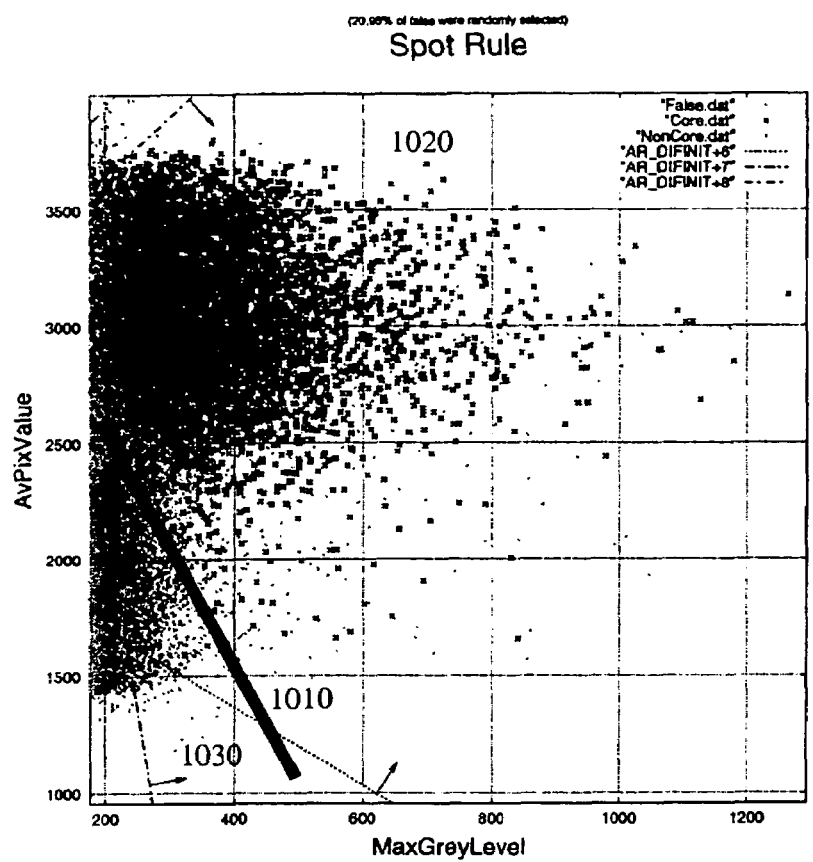
FIG. 10 illustrates an example of using a rule to separate out false positives from a set of detected anomalies.

The training and tuning module 210 uses the images in the training database 215 to create parameter values and thresholds to separate real abnormalities from false positives. These "decision surfaces" are threshold values that are used to separate one class of marked abnormalities from another based on feature values. FIG. 10 shows an example of such a decision surface 1010, used to separate true lesions from false positives for one particular type of abnormality. In this example one feature is plotted verses another feature in a scatter plot. The true lesions appear on this scatter plot as dark x's, the false positives as light dots. It is apparent that the true lesions tend to cluster in a band near the center of the scatter plot, while the false positives are mostly in a cluster below the true positives. By using the dark dashed line as a decision surface, and accepting only the marks above the line, most of the false positives will be eliminated while most of the true positives are retained. It can be appreciated that the more "training", or "example" cases one has, the better the line or decision surface will be placed. In practice, a typical CAD code may have dozens of such rules, as well as a classifier to allow decisions to be made in a complex multi-dimensional decision space.

The training and tuning module 210 uses the images in the training database 215 to create decision surfaces to separate real abnormalities from false positives. FIG. 10 shows an example of such a decision surface, used to separate true lesions from false positives for one particular type of abnormality. In this example one feature is plotted verses another feature in a scatter plot. The true lesions appear on this scatter plot as dark x's, the false positives as light dots. It is apparent that the true lesions tend to cluster in a band near the center of the scatter plot, while the false positives are mostly in a cluster below the true positives. By using the dark dashed line as a decision surface, and accepting only the marks above the line, most of the false positives will be eliminated while most of the true positives are retained. It can be appreciated that the more "training", or "example" cases one has, the better the line or decision surface will be placed. In practice, a typical CAD code may have dozens of such rules, as well as a classifier to allow decisions to be made in a complex multi-dimensional decision space.

The images in the testing database 220 are used to test and verify the decision surfaces by running images with known abnormalities through the trained CAD code 205 to verify that it successfully separates the true abnormalities from false positives.

For one embodiment, an additional database, the tuning database 225 may be added to the training cycle. The tuning database 225 includes digitally acquired images that have been remapped to the canonical format. FIG. 9C shows such an image. The tuning database 225 is used to make fine adjustments in the decision surfaces generated from film-based images. For example, even remapped images that are digitally acquired may not match exactly the characteristics of film-based images. Therefore, tuning database 225 may be used to make fine adjustments to the decisioning, to account for any differences between film-based and digitally acquired images. The tuning database 225 includes many fewer cases than the training database 215 and the testing database 220. For one embodiment, the tuning database 225 may be used to constantly incrementally improve the decision surfaces, as additional digital images are acquired.

Figure 2B:
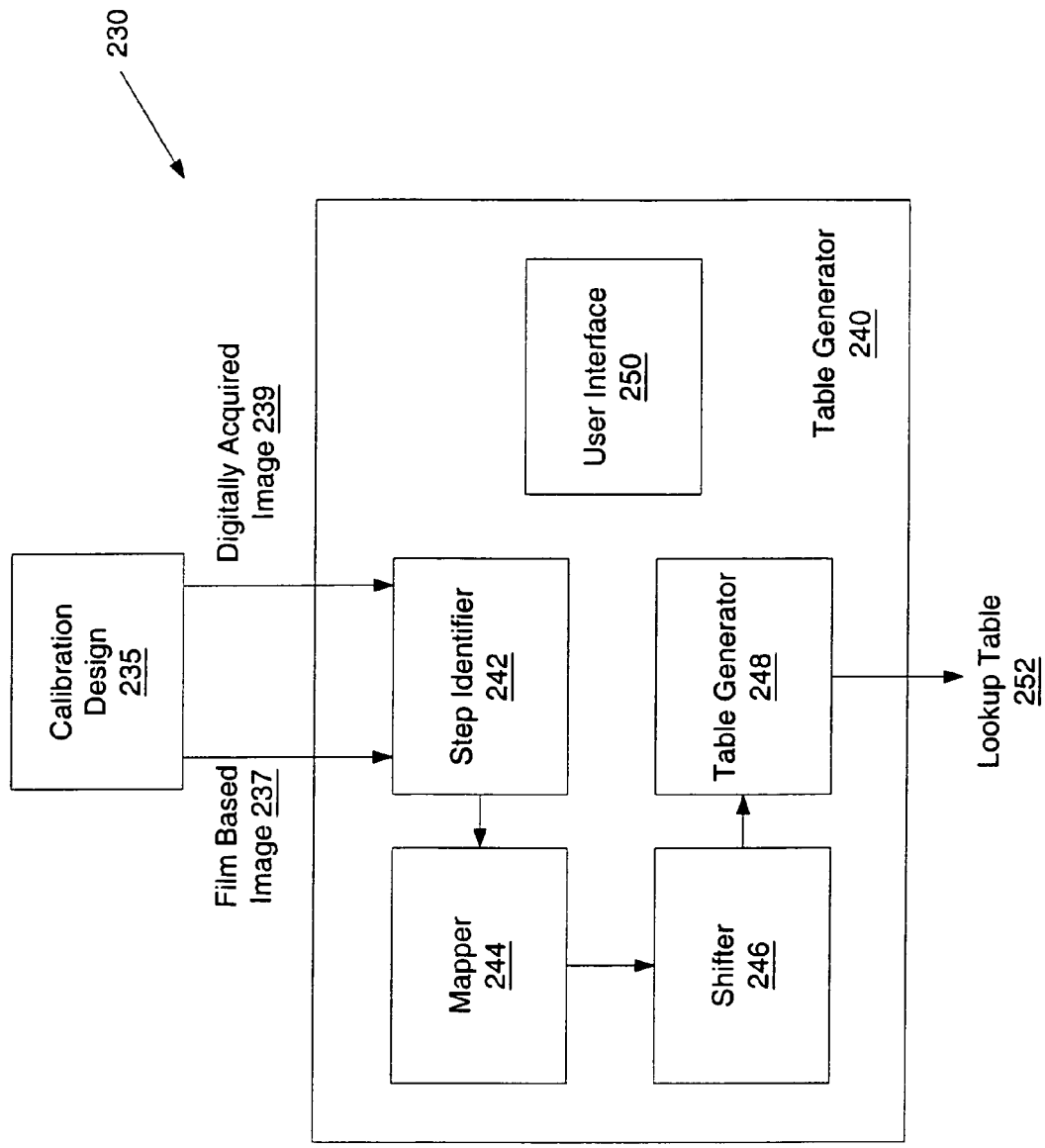
FIG. 2B is a block diagram of one embodiment of the system to generate the lookup table for converting images.

FIG. 2B is a block diagram of one embodiment of the system to generate the lookup table for remapping images. In the parent application, this process was called "normalization", and a method was described for how this can be done. The present application provides additional details and further illustrates the technique by providing some concrete examples in this application.

Figure 6:
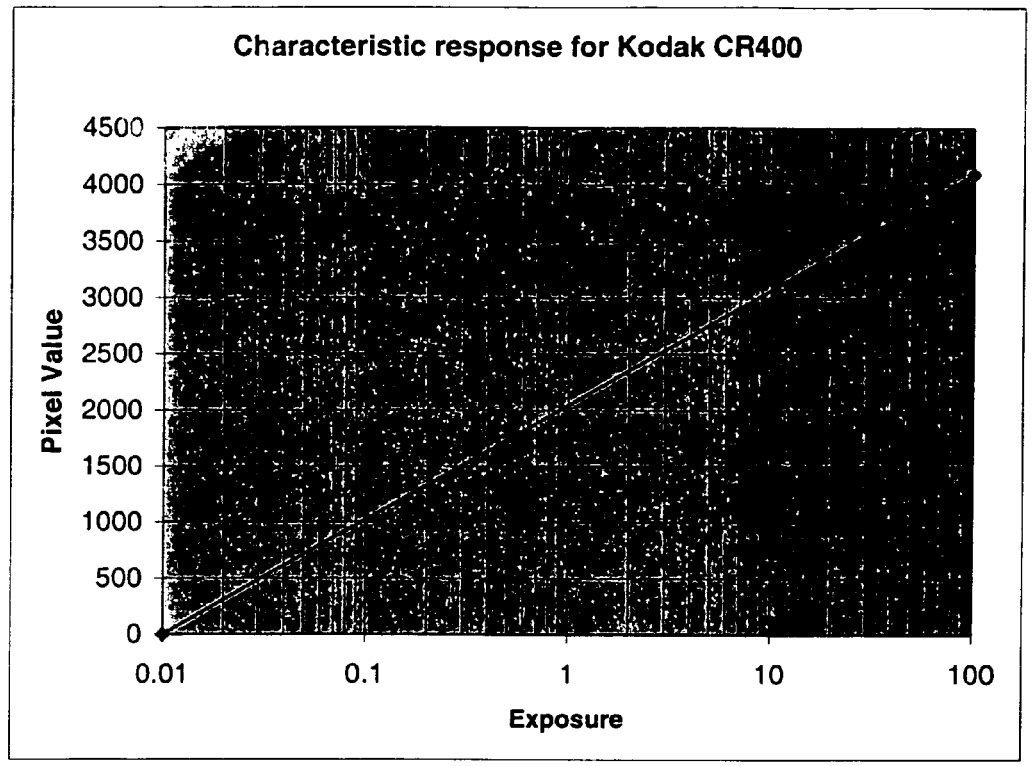
FIG. 6 illustrates a characteristic curve for a digital detector.

In general, the CAD code, once developed and tuned on film data characterized by the response curves in FIGS. 5A and B, cannot immediately be used to analyze data obtained by a digital detector such as the response shown in FIG. 6. This is because the slope and intercept of the two curves are different. FIG. 6 shows a typical response of a digital detector with Log(exposure). FIG. 6 illustrates the characteristic response of the Kodak CR400 detector.

Because of this difference the exposure difference caused by the same lesion will result in different pixel differences when detected by the digital detector than by film. This can be solved by determining the transformation or mapping required to turn the response curve in FIG. 6 to that of FIGS. 5A-B.

Figure 7:
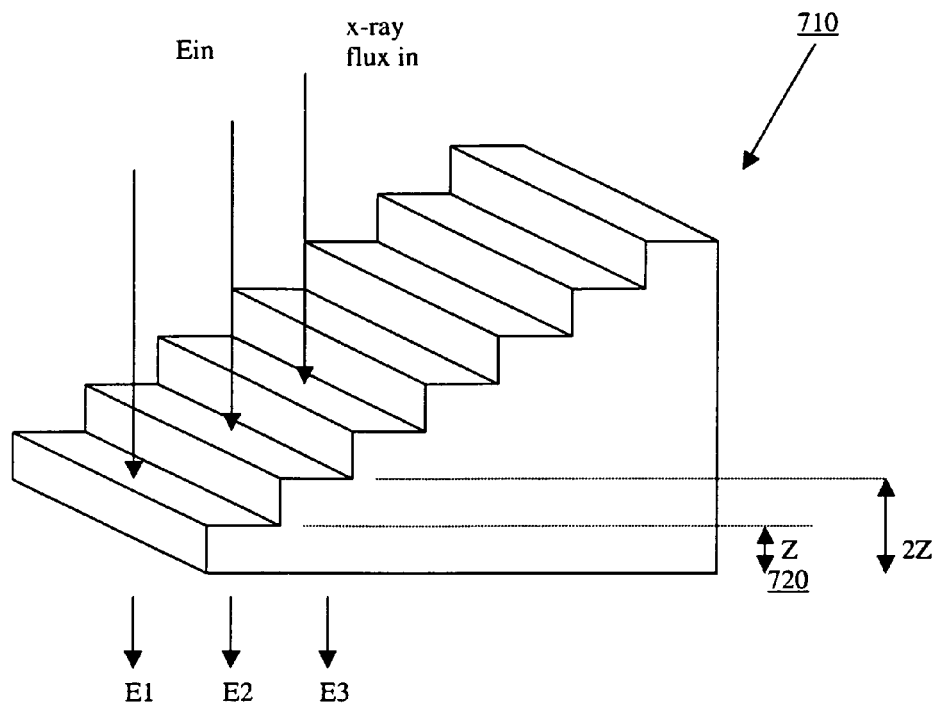
FIG. 7 is an illustration of a step wedge used to calibrate the response of the detectors.

The system 230 includes a calibration design 235 which is used to create comparison images for film-based and digitally acquired images. In FIG. 7 illustrates an exemplary calibration design, a step wedge. Alternative calibration designs may be used. The calibration design 235 is placed on top of a film/screen detector, and a digital cassette/detector and exposed to x-rays.

For the step wedge 710 shown in FIG. 7, the varying thickness of each step 720 changes the attenuation of the x-rays and therefore exposes the film/screen or digital detector to different exposures at each step 710. The resulting pixel value at under each step on the image then follows a curve such as the responses shown in FIG. 5A, 5B, or 6.

Returning to FIG. 2B, the digitized film image 237 and digitally acquired image 239, each exposed with the calibration design 235 are input to table generator 240.

Step identifier 242 assigns values to the pixel values at each of the steps. The step pixel values for the screen film system are given by PVf1, PVf2, PVf3. The step pixel values for the digital detector as PVd1, Pvd2, PVd3.

Mapper 244 plots PVf versus PVd to provide the mapping from digital detector pixel values to film/screen pixel values.

Figure 8:
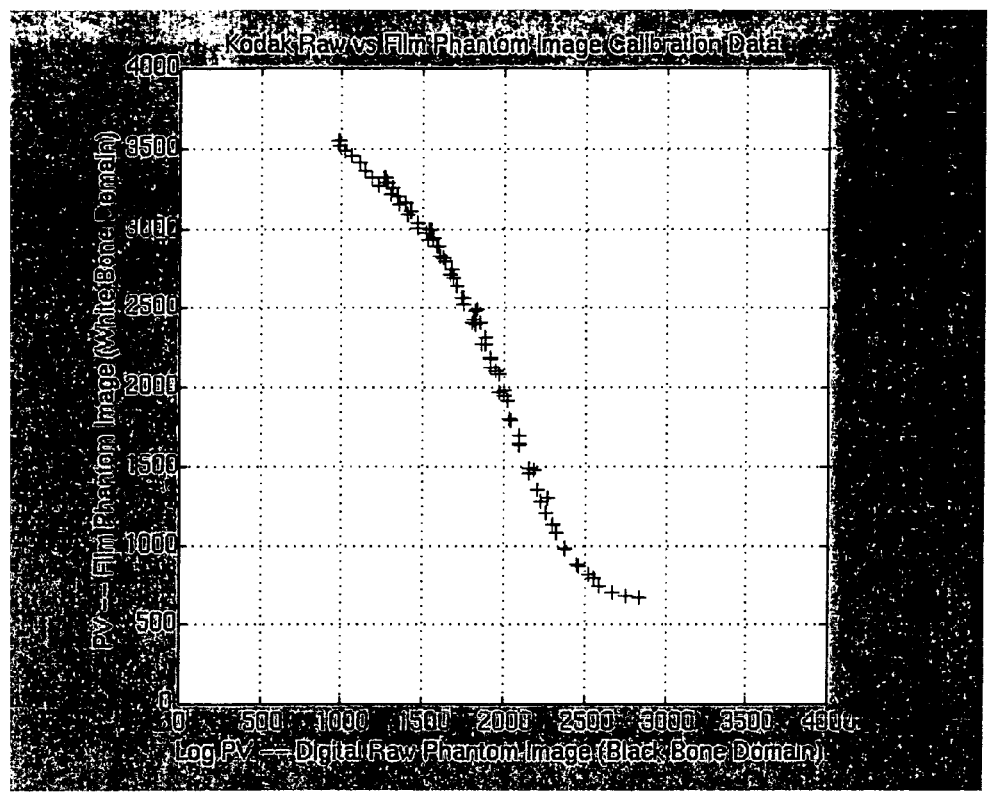
FIG. 8 is a mapping of the pixel values from digital to digitized film based images.

This is what is meant by "transform" or "mapping", or, as in the previous application, "normalization". FIG. 8 is a mapping of the pixel values from digital to digitized film based images.

Using this transform, given image data from one type of detector, e.g. digital mammograms or digital chest, the image data can be transformed such that it looks like an image taken by film/screen. This may be referred to as an image that has been "mapped" into "film space". When this has been accomplished, the CAD code can be applied to the transformed data with reasonable confidence that the results will be comparable to that obtained by the CAD code applied to film/screen. It can be appreciated that it is not necessary to map the digital data into film space, it can, if desired, be mapped into any desired space, i.e., mapped onto a curve having any slope and intercept. It may often be desired for example, to map onto a space that, unlike film, has a linear response to log(exposure), without the non-linear sections in FIG. 8. This desired space is referred to as the "standard canonical form". In one embodiment, the standard canonical form is the curve that characterizes the response of film images, since the CAD code was developed using data from film.

After the mapping described above, optionally, shifter 246 may be used to shift all pixel values by a constant: PVnew=PVold−offset The purpose of shifting is to ensure that the absolute pixel values of the transformed image have some desired range. For example, it may be desirable to have the mean pixel value in the image have a constant value, or a lowest or highest pixel value, etc. To accomplish this, one would calculate the mean value then and add or subtract a constant from the entire image to shift it to the desired value.

Table generator 248 generates a look-up table incorporating the remapping and shifting operations. For one embodiment, the user may select whether to include the shifting operation, through user interface 250. For one embodiment, the user may alter the mapping, shift, or look-up table as well.

The output of table generator 240 is a look-up table that may be used in the CAD system. In general, this system 230 is implemented by the manufacturer of the CAD system, in order to generate a lookup table, which will be incorporated into the CAD system. Thus, this remapping process is transparent to the user of the system.

Figure 2C:
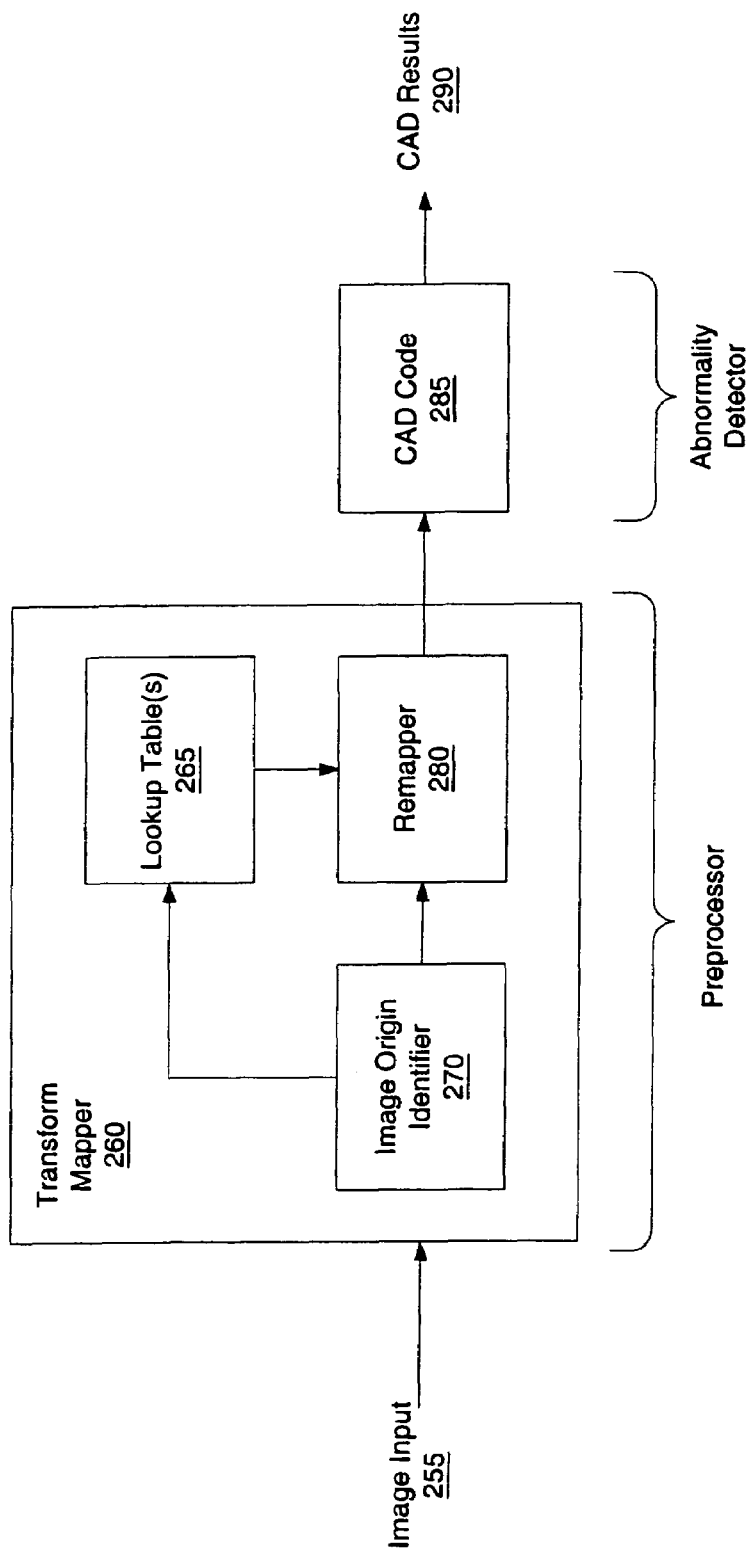
FIG. 2C is a block diagram of one embodiment of the image analysis system used to convert images to the "standard canonical format."

FIG. 2C is a block diagram of one embodiment of the image analysis system used to convert images to the "standard canonical format." On FIG. 1, the transform mapper 260 is part of the image analysis system 120. The converter illustrated in FIG. 2C corresponds to the "preprocessor" described in the parent application of this case.

The image input 255 is a digital image. The image input 255 may be obtained from a digitized film image, or from a digitally acquired image. The transform mapper 260 receives the image input, and using image origination identifier 270 determines the origin of the image. The origin of the image identifies whether the image was acquired from a film, and if so what type, or from a digital detector, and if so what type. For one embodiment, there are separate look-up tables 265 for each type of transformation. Thus, the system is able to transform inputs from a variety of sources to the "standard canonical format." For one embodiment, the image label identifies the origin of the image. For another embodiment, the image origin may be provided by a user. For another embodiment, a label or other type of attached identifier provides origin data.

The remapper 280 then loads the appropriate lookup table 265, based on the known "standard canonical format" and the known origin of the image. The remapper 280 remaps the image into the "standard canonical format." The remapped image is passed to the CAD code 285, to perform CAD processing on the image. As discussed above, the CAD code 285 uses the delimiters to identify abnormalities, and remove false positives from the list of identified abnormalities. The output of the CAD code 285 are the CAD results. The CAD results may be a list of abnormalities, their class, and location. Alternatively, the CAD results may be graphical, having graphical icons to identify each of the identified abnormalities, with an icon image identifying the type of abnormality. Alternatively, the CAD results may be a combination of the above.

In this way, the CAD system, using transform mapper 260 can use CAD code 285 trained on existing film-based images to identify abnormalities in digitally acquired medical images. Note that the original format of the image input 255 is irrelevant, because transform mapper 260 converts images to the "standard canonical form." Furthermore, the standard canonical form, as discussed above, may be set by user preference. For one embodiment, the standard canonical form is the form of the film-based images that were originally used to train the CAL) code 285.

Figure 3:
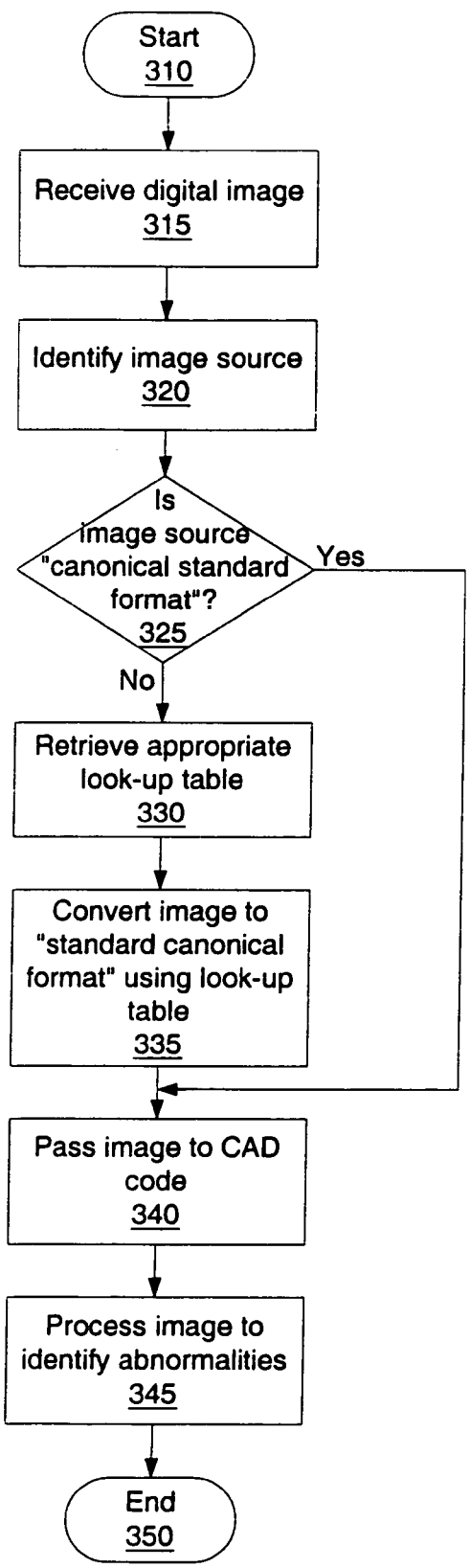
FIG. 3 is a flowchart of using the present process.

FIG. 3 is a flowchart of using the present process. For one embodiment, this process occurs automatically in the image analysis system, when an image is received for processing. The process starts at block 310.

At block 315, a digital image is received. At block 320, the image source is identified. For one embodiment, the image source is identified based on the data header, which specifies the image source. The image source may be one of a variety of films, or one of a variety of digital detectors. For one embodiment, the image source may further identify the modality of the image, if the image analysis system is a multi-modal analysis system.

At block 325, the process determines whether the image source provides images of the "standard canonical form." For one embodiment, the user sets a standard canonical form, to which all other images are converted. The process determines whether the present image is in that form. The image is analyzed to determine whether the responses are that of the standard canonical form. If the image is in the standard canonical form, the process continues directly to block 340. Otherwise, the process continues to block 330. For one embodiment, blocks 320 and 325 may be skipped. In that instance, the remapping is performed regardless of the original format of the image.

At block 330, the appropriate lookup table is retrieved. For one embodiment, various lookup tables may be stored, for conversion from various formats to the standard canonical form. For another embodiment, if only one image source is used, this step may be skipped, and the process may go directly from block 315 to block 335.

At block 335, the image is converted to the standard canonical format using the lookup table. For one embodiment, the lookup table is a conversion for each pixel value to a new, adjusted, pixel value. As discussed above, the new adjusted pixel value takes into consideration the shifting required because of the different response curves, as well as an offset, if appropriate.

At block 340, the image is passed to the CAD code, for CAD processing. At block 345, the image is processed to identify abnormalities, in the standard way. The process then ends at block 350.

In this way, a digital image from one of a plurality of sources may be received, and remapped into the standard canonical form, for processing by the CAD code. This is advantageous because it does not require obtaining an extensive database of images from the same source, for training, testing, or tuning the CAD code.

Figure 4:
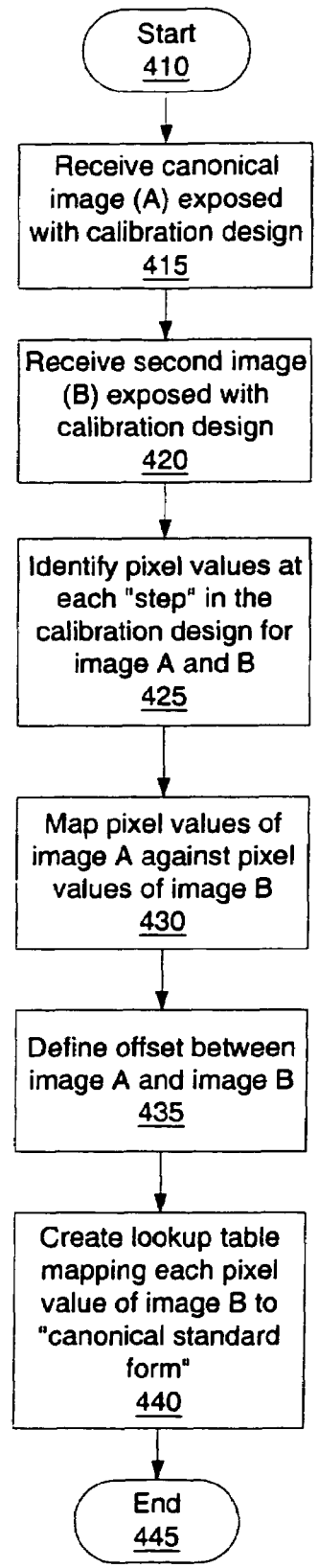
FIG. 4 is a flowchart of one embodiment of obtaining a converter for images from digital response to the canonical.

FIG. 4 is a flowchart of one embodiment of obtaining a converter for images from digital response to the canonical. This process is initiated by the code developer, when a new type of film or digital detector is added to the system. The process starts at block 410.

At block 415, the canonical image (image A) exposed with a calibration design is received. For one embodiment, this standard canonical format may be stored, and thus not actually created at the time of generating the lookup table. For another embodiment, the "standard" film is exposed each time such a lookup table is created. For another embodiment, the standard canonical format may not be a film-based format. Rather, the standard canonical format may be a manipulated format. For example, most film-based and digital detectors have an attenuation point, beyond which the response is nonlinear. The standard canonical form may be a form which does not have this attenuation. Thus, receiving the standard canonical image with the calibration design may include generating the response desired.

At block 420, the second image (image B) exposed with a calibration design is received. Image B is the image detected using the detector/film which is to be remapped to the standard canonical form.

At block 425, pixel values are identified at each "step" in the calibration design for images A and B. The pixel value (PV) at each step is designed PVa(1) through PVa(n) for image A, and PVb(1) through PVb(n) for image B.

At block 430, the pixel values of image A are mapped against the pixel values of image B. FIG. 8 shows such a mapping. As can be seen $PV_{in}$ is mapped against $PV_{canonical}$.

At block 435, the offset between image A and image B is defined. The offset is a constant added to image B to equal image A. The offset shifts the zero crossing of the response curve.

At block 440, a lookup table is created, mapping each pixel value of image B to the "canonical standard form." This lookup table is then added to the transform mapper of the image analysis system. The image analysis system then uses the lookup table to remap images received from the same detector/film as image B to the standard canonical form. The process then ends at block 445.

The above described apparatus and process permits the analysis of images obtained through different imaging mechanisms, using the same CAD code. This eliminates the need for obtaining a large volume of test data for training and testing the CAD code for each of the different imaging mechanisms. The imaging mechanism may be a different type of film, or a different detector. For example, one imaging mechanism may be using a digital detector. For another embodiment, one imaging mechanism may be using a new type of film, having a different response than the standard canonical response.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer program product embodied in a computer-readable medium for analyzing a first medical image to detect anatomical abnormalities therein, the first medical image acquired from a first type of imaging system having a first response characteristic, comprising:
    computer-aided detection (CAD) code comprising at least one neural network-based automated anatomical abnormality detection algorithm trained using training images acquired from a second type of imaging system having a second response characteristic different than the first response characteristic; and
    transforming code based on said first and second response characteristics for transforming pixel values of the first medical image to approximate values that would have been obtained if the first medical image had been acquired using the second type of imaging system such that said CAD code is applicable for the first medical image.

2. The computer program product of claim 1, wherein said transforming code transforms said pixel values using a first lookup table computed using said first and second response characteristics.

3. The computer program product of claim 2, further comprising a second lookup table used by said transforming code for transforming pixel values of a second medical image acquired from a third type of imaging system having a third response characteristic different than said first and second response characteristics to approximate values that would have been obtained if the second medical image had been acquired using the second type of imaging system, whereby said CAD code is also applicable for said second medical image despite having been acquired using a different type of imaging system than said training or first medical images.

4. The computer program product of claim 3, wherein said transforming code further comprises:
    identifying code for identifying which type of imaging system was used to acquire each of said medical images;
    a first remapping code for utilizing said first lookup table to remap medical images acquired using said first type of imaging system; and
    a second remapping code for utilizing said second lookup table to remap medical images acquired using said third type of imaging system.

5. The computer program product of claim 4, wherein said identifying code further comprises code for reading DICOM headers associated with said medical images.

6. The computer program product of claim 1, wherein said first type of imaging system comprises a film-based detector, and wherein said second type of imaging system comprises a digital detector.

7. The computer program product of claim 1, wherein said first type of imaging system comprises a first film-based detector, and wherein said second type of imaging system comprises a second film-based detector different than said first film-based detector.

8. The computer program product of claim 1, wherein said first type of imaging system comprises a first digital detector, and wherein said second type of imaging system comprises a second digital detector different than said first digital detector.

9. The computer program product of claim 1, wherein said first type of imaging system comprises a digital detector, and wherein said second type of imaging system comprises a film-based detector.

10. A method for analyzing a first medical image to detect anatomical abnormalities therein using a computer-aided detection (CAD) algorithm including at least one neural network-based automated anatomical abnormality detection algorithm, the first medical image acquired from a first type of imaging system having a first response characteristic, the CAD algorithm trained using training images acquired from a second type of imaging system having a second response characteristic different than the first response characteristic, comprising:

transforming pixel values of the first medical image to approximate pixel values that would have been obtained if the first medical image had been acquired using the second type of imaging system such that the CAD code is applicable for said first medical image.

11. The method of claim 10, wherein said transforming pixel values comprises using a first lookup table designed using said first and second response characteristics.

12. The method of claim 11, further comprising using a second lookup table for transforming pixel values of a second medical image acquired from a third type of imaging system having a third response characteristic different than said first and second response characteristics to approximate values that would have been obtained if the second medical image had been acquired using the second type of imaging system such that said CAD code is also applicable for said second medical image.

13. The method of claim 11, further comprising:
identifying which type of imaging system was used to acquire each of said medical images;
applying said first lookup table for medical images acquired using said first type of imaging system; and
applying said second lookup table for medical images acquired using said third type of imaging system.

14. The method of claim 13, wherein said identifying further comprises reading DICOM headers associated with said medical images.

15. The method of claim 10, wherein said first type of imaging system comprises a film-based detector, and wherein said second type of imaging system comprises a digital detector.

16. The method of claim 10, wherein said first type of imaging system comprises a first film-based detector, and wherein said second type of imaging system comprises a second film-based detector different than said first film-based detector.

17. The method of claim 10, wherein said first type of imaging system comprises a first digital detector, and wherein said second type of imaging system comprises a second digital detector different than said first digital detector.

18. The method of claim 10, wherein said first type of imaging system comprises a digital detector, and wherein said second type of imaging system comprises a film-based detector.

19. A method for analyzing medical images to detect anatomical abnormalities therein, comprising:

receiving a medical image;

applying a computer-aided detection (CAD) algorithm to said medical image to detect anatomical abnormalities therein, wherein the CAD algorithm is a neural network-based automated anatomical abnormality detection algorithm; and prior to said applying said CAD algorithm, performing the steps of:

identifying a first response characteristic associated with an acquisition of the medical image;

determining whether the first response characteristic is substantially similar to a second response characteristic associated with an acquisition of a plurality of training images used to train the CAD algorithm; and if said first response characteristic is not substantially similar to said second response characteristic, transforming pixel values of said medical image to approximate pixel values that would have been obtained if the medical image had been acquired in a manner associated with said second response characteristic, such that said CAD code is applicable for the medical image.

20. The method of claim 19, wherein said first response characteristic is similar to a film-based image acquisition response characteristic, and wherein said second response characteristic is similar to a digital image acquisition response characteristic.

21. The method of claim 19, wherein said first response characteristic is similar to a first film-based image acquisition response characteristic, and wherein said second response characteristic is similar to a second film-based image acquisition response characteristic.

22. The method of claim 19, wherein said first response characteristic is similar to a first digital image acquisition response characteristic, and wherein said second response characteristic is similar to a second digital image acquisition response characteristic.

23. The method of claim 19, wherein said first response characteristic is similar to a digital image acquisition response characteristic, and wherein said second response characteristic is similar to a film-based acquisition response characteristic.

* * * * *